United States Patent [19]
Deevi et al.

[11] Patent Number: 5,247,949
[45] Date of Patent: Sep. 28, 1993

[54] METHOD FOR PRODUCING METAL CARBIDE HEAT SOURCES

[75] Inventors: Seetharama C. Deevi, Midlothian; Mohammad R. Hajaligol; Donald B. Losee, Jr., both of Richmond, all of Va.

[73] Assignee: Philip Morris Incorporated, New York, N.Y.

[21] Appl. No.: 639,241

[22] Filed: Jan. 9, 1991

[51] Int. Cl.$^5$ .................................. A24B 15/00
[52] U.S. Cl. ......................... 131/359; 131/369; 131/194; 44/504; 44/520; 44/522; 44/535
[58] Field of Search ............ 131/359, 369, 194; 44/520, 504, 521, 522, 14, 535, 16 R

[56] References Cited

U.S. PATENT DOCUMENTS

| | | |
|---|---|---|
| 1,771,366 | 7/1930 | Wyss et al. |
| 2,104,266 | 1/1938 | McCormick |
| 2,780,537 | 2/1957 | Stelling et al. |
| 2,907,686 | 10/1959 | Siegel |
| 3,200,819 | 8/1965 | Gilbert |
| 3,258,015 | 6/1966 | Ellis et al. |
| 3,356,094 | 12/1967 | Ellis et al. |
| 3,572,993 | 3/1971 | Rogers |
| 3,812,864 | 5/1974 | Cartwright ............... 131/359 |
| 3,885,023 | 5/1975 | Gray et al. |
| 3,943,941 | 3/1976 | Boyd et al. |
| 4,141,369 | 2/1979 | Burruss |
| 4,303,083 | 12/1981 | Burruss, Jr. |
| 4,310,334 | 1/1982 | Waldron |
| 4,319,591 | 3/1982 | Keith et al. ............... 131/359 |
| 4,340,072 | 7/1982 | Bolt et al. |
| 4,708,151 | 11/1987 | Shelar |
| 4,714,082 | 12/1987 | Banerjee et al. |
| 4,789,534 | 12/1988 | Laine |
| 4,793,365 | 12/1988 | Sensabaugh, Jr. et al. |
| 4,794,042 | 12/1988 | Kubota et al. |
| 4,799,979 | 1/1989 | Baldi |
| 4,842,759 | 6/1989 | Okamura et al. |
| 5,146,934 | 9/1992 | Deevi et al. ............... 131/359 |
| 5,188,130 | 2/1993 | Hajaligol et al. ............... 131/359 |

FOREIGN PATENT DOCUMENTS

| | | |
|---|---|---|
| 0117355 | 12/1983 | European Pat. Off. |
| 0123318 | 4/1984 | European Pat. Off. |
| 0154903 | 2/1985 | European Pat. Off. |
| 0180162 | 10/1985 | European Pat. Off. |
| 0236992 | 3/1987 | European Pat. Off. |
| 0245732 | 5/1987 | European Pat. Off. |
| 0372985 | 6/1990 | European Pat. Off. |
| 0430658 | 6/1991 | European Pat. Off. |
| WO 90/10394 | 9/1990 | PCT Int'l Appl. |
| 1573454 | 8/1980 | United Kingdom |

OTHER PUBLICATIONS

J. A. Amiese et al., "Mössbauer Spectroscopic Study of Passivated Small Particles of Iron and Iron Carbide", *The Journal of Physical Chemistry*, 85, pp. 2484-2488 (1981).

M. Audier et al., "Electronic Microscopic and Mössbauer Study of the Iron Carbides $\theta$-Fe$_3$C and $\chi$-Fe$_5$C$_2$ Formed During the Disproportionation of CO", *Journal of Crystal Growth*, 64, pp. 291-296 (1983).

M. Audier et al., "Transmission Electronic Microscope Study of Single Crystals of Fe$_7$C$_3$", *Journal of Crystal Growth*, 63, pp. 125-134 (1983).

(List continued on next page.)

*Primary Examiner*—V. Millin
*Assistant Examiner*—J. Doyle
*Attorney, Agent, or Firm*—Joseph M. Guiliano; Marta E. Gross

[57] ABSTRACT

This invention relates to a heat source comprising metal carbide and a method for preparing the same using a reducing/carbidizing atmosphere. The metal carbide heat sources of this invention have ignition temperatures that are substantially lower than conventional carbon particles normally used in carbonaceous heat sources, while at the same time provide sufficient heat to release a flavored aerosol from a flavor bed for inhalation by the smoker. Upon combustion, the heat sources produce substantially no carbon monoxide.

42 Claims, 3 Drawing Sheets

OTHER PUBLICATIONS

G. H. Barton and B. Gale, "The Structure of a Pseudo-Hexagonal Iron Carbide", *Acta Crystallographica*, 17, pp. 1460-1462 (1964).

H. Bernas et al., "Electronic Exchange and the Mössbauer Effect in Iron-Based Interstitial Compounds", *Journal of Physical Chemistry of Solids*, 28, pp. 17-24 (1967).

J. P. Bouchaud and R. Fruchart, "Contribution a la Connaissance du Diagramme Manganese-Carbone", *Bulletin de la Societe Chimique de France*, pp. 1579-1583 (1964).

"Carbides", *The Encyclopedia Britannica*, 1965, pp. 862-863 and 600-601.

P. Courty and B. Delmon, "Obtention d'Oxydes Mixtes Divisés par Décomposition de Pré curseurs Amorphes (sels organiques amorphes)", *C. R. Acad. Sc. Paris, Ser. C*, 268, pp. 1874-1875 (1969).

M. J. Duggin and L. J. E. Hofer, "Nature of $_{102}$-Iron Carbide", *Nature*, 212, pp. 248-250 (1966).

D. J. Dwyer and J. H. Hardenbergh, "The Catalytic Reduction of Carbon Monoxide over Iron Surfaces: A Surface Science Investigation", *Journal of Catalysis*, 87, pp. 66-76 (1984).

R. Fruchart, "Le Rôle du Facteur Electronique dans les Structures du Type Cémentite et les Structures Dérivées", *Bulletin de la Societe Chimique de France*, pp. 2652-2657 (1964).

R. R. Gatte and J. Phillips, "The Influence of Particle Size and Structure on the Mössbauer Spectra of Iron Carbides Formed During Fisher-Tropsch Synthesis", *Journal of Catalysis*, 104, pp. 365-374 (1987).

F. H. Herbstein and J. A. Snyman, "Identification of Eckstrom Adcock Iron Carbide as $Fe_7C_3$", *Inorganic Chemistry*, 3, pp. 894-896 (1964).

T. Ya. Kosolapova, *Carbides: Properties, Production, and Applications*, pp.171-177, Plenum Press, New York 1971.

G. Le Caer et al., "Etude par Spectrométrie Mössbauer des Carbures de Fer $Fe_3C$ et $Fe_5C_2$," *Journal of Solid State Chemistry*, 19, pp. 1928 (1976).

S. C. Lin and J. Phillips, "Study of Relaxation Effects in the $^{57}Fe$ Mössbauer Spectra of Carbon-Supported Iron Carbide Particles", *Journal of Applied Physics*, 58, pp. 1943-1949 (1985).

A. Michel, "Propriétés et Liaisons Dans les Carbures de Fer", *Bulletin de la Societe Chimique de France, pp. 143-147 (1961)*.

J. W. Niemantsverdriet et al., "Behavior of Metallic Iron Catalysts during Fischer-Tropsch Synthesis Studied with Mössbauer Spectroscopy, X-ray Diffraction, Carbon Content Determination, and Reaction Kinetic Measurements", *The Journal of Physical Chemistry*, 84, pp. 3363-3371 (1980).

J.-P. Senateur, "Contribution a L'Etude Magnétique et Structurale du Carbure de Hägg", *Annales de Chimie*, 2, pp. 103-122 (1967).

METHOD FOR PRODUCING METAL CARBIDE HEAT SOURCES

BACKGROUND OF THE INVENTION

This invention relates to an improved metal carbide heat source and an improved method for making the heat source. The method and heat source of this invention are particularly suitable for use in a smoking article such as that described in commonly assigned U.S. Pat. No. 4,991,606. The heat source made by the method of this invention has low ignition and high combustion temperatures that generate sufficient heat to release a flavored aerosol from a flavor bed for inhalation by the smoker. Upon combustion, the heat sources of this invention produce substantially no carbon monoxide.

According to the method of this invention, a metal species is mixed with a carbon source and converted to metal carbide by heating the mixture in the presence of a carbidizing atmosphere. In a preferred embodiment, the metal species/carbon source mixture is pre-formed into a desired shape and converted to metal carbide in situ, without substantially altering the shape of the mixture.

There have been previous attempts to provide a heat source for a smoking article. While providing a heat source, these attempts have not produced a heat source having all of the advantages of the present invention.

For example, Siegel U.S. Pat. No. 2,907,686 discloses a charcoal rod coated with a concentrated sugar solution which forms an impervious layer during burning. It was thought that this layer would contain gases formed during smoking and concentrate the heat thus formed.

Ellis et al. U.S. Pat. No. 3,258,015 and Ellis et al. U.S. Pat. No. 3,356,094 disclose a smoking device comprising a nicotine source and a tobacco heat source.

Boyd et al. U.S. Pat. No. 3,943,941 discloses a tobacco substitute which consists of a fuel and at least one volatile substance impregnating the fuel. The fuel consists essentially of combustible, flexible and self-coherent fibers made of a carbonaceous materials containing at least 80% carbon by weight. The carbon is the product of the controlled pyrolysis of a cellulose-based fiber containing only carbon, hydrogen and oxygen.

Bolt et al. U.S. Pat. No. 4,340,072 discloses an annular fuel rod extruded or molded from tobacco, a tobacco substitute, a mixture of tobacco substitute and carbon, other combustible materials such as wood pulp, straw and heat-treated cellulose or a sodium carboxymethyl-cellulose (SCMC) and carbon mixture.

Shelar et al. U.S. Pat. No. 4,708,151 discloses a pipe with replaceable cartridge having a carbonaceous fuel source. The fuel source comprises at least 60-70% carbon, and most preferably 80% or more carbon, and is made by pyrolysis or carbonization of cellulosic materials such as wood, cotton, rayon, tobacco, coconut, paper and the like.

Banerjee et al. U.S. Pat. No. 4,714,082 discloses a combustible fuel element having a density greater than 0.5 g/cc. The fuel element consists of comminuted or reconstituted tobacco and/or a tobacco substitute, and preferably contains 20%-40% by weight of carbon.

Published European patent application 0 117 355 by Hearn et al. discloses a carbon heat source formed from pyrolized tobacco or other carbonaceous material such as peanut shells, coffee bean shells, paper, cardboard, bamboo, or oak leaves.

Published European patent application 0 236 992 by Farrier et al. discloses a carbon fuel element and process for producing the carbon fuel element. The carbon fuel element contains carbon powder, a binder and other additional ingredients, and consists of between 60 and 70% by weight of carbon.

Published European patent application 0 245 732 by White et al. discloses a dual burn rate carbonaceous fuel element which utilizes a fast burning segment and a slow burning segment containing carbon materials of varying density.

These heat sources are deficient because they provide unsatisfactory heat transfer to the flavor bed, resulting in an unsatisfactory smoking article, i.e., one which fails to simulate the flavor, fuel and number of puffs of a conventional cigarette.

Commonly assigned U.S. Pat. No. 5,076,296 and commonly assigned herewith, solved this problem by providing a carbonaceous heat source formed from charcoal that maximizes heat transfer to the flavor bed, releasing a flavored aerosol from the flavor bed for inhalation by the smoker, while minimizing the amount of carbon monoxide produced.

However, all conventional carbonaceous heat sources liberate some amount of carbon monoxide gas upon ignition. Moreover, the carbon contained in these heat sources has a relatively high ignition temperature, making ignition of conventional carbonaceous heat sources difficult under normal lighting conditions for a conventional cigarette.

Attempts have been made to produce noncombustible heat sources for smoking articles in which heat is generated electrically. E.g., Burruss, Jr., U.S. Pat. No. 4,303,083, Burruss U.S. Pat. No. 4,141,369, Gilbert U.S. Pat. No. 3,200,819, McCormick U.S. Pat. No. 2,104,266 and Wyss et al. U.S. Pat. No. 1,771,366. These devices are impractical and none has met with any commercial success.

Attempts have been made to produce a combustible, non-carbonaceous heat source. Commonly assigned U.S. Pat. No. 5,040,522 relates to a metal carbide heat source. Although combustion of the metal carbide heat source yields up to tenfold less carbon monoxide than combustion of conventional carbonaceous heat sources, some carbon monoxide is still produced. Copending U.S. patent application Ser. No. 443,636, filed on Nov. 29, 1989, and commonly assigned herewith, relates to a metal nitride heat source that also produces substantially no carbon monoxide or nitrogen oxides upon combustion. Copending U.S. patent application Ser. No. 556,732, filed on Jul. 20, 1990, and commonly assigned herewith is directed to a heat source comprising carbon and metal carbide that also produces substantially no carbon monoxide upon combustion.

Attempts have been made to produce pyrophoric materials comprising metal aluminides for use as a decoy for heat-seeking missiles. E.g., Baldi, U.S. Pat. No. 4,799,979. These devices, however, combust too rapidly and produce too intense a heat to be used as a heat source in a smoking article.

Methods of producing metal carbides are Grey et al. U.S. Pat. No. 3,885,023 and Okamura et al. published European patent application 0 180 162 disclose the preparation of iron carbide particles by reducing iron oxide in a carbon monoxide atmosphere. Stelling et al. U.S. Pat. No. 2,780,537, Okamura U.S. Pat. No. 4,842,759 and Shibuya et al. published European patent application 0 123 318 disclose the preparation of iron carbide particles by reducing iron oxide in a carbon monoxide/reducing gas mixture. Rogers U.S. Pat. No. 3,572,993 discloses the preparation of ultrafine iron carbide particles by reducing iron carbonyl in a carbon monoxide/hydrogen atmosphere.

Additionally, metal carbides may be prepared by reduction of the metal oxide with elemental carbon, carbidization of the metal or metal oxide with a gaseous species such as methane, ethane, ethylene, or propane, and direct reaction of the fully reduced metal with elemental carbon (Goldschmidt, H. A., *Interstitial Alloys*, pp. 214–31 (Butterworth, London, 1967)).

A shortcoming of these production methods is the lack of control over end-product composition. The above methods yield polymorphous iron carbide containing carbon deposits which, upon combustion, incompletely oxidize to generate carbon monoxide, albeit at lower levels than in carbonaceous heat sources.

Yet another shortcoming of prior methods is the number of steps required to produce a metal carbide heat source. These steps involve mixing metal carbide precursor materials, reducing the precursor materials, carbidizing the intermediate metal species, mixing the metal carbide with a binder, forming the metal carbide/binder mixture into a desired shape, and baking the mixture.

A further shortcoming of known methods of preparing metal carbide is that the metal carbide is produced in particulate form. Iron carbides by nature are brittle, intractable materials, which, once formed, are difficult and expensive to form into a desired shape.

It would be desirable to provide a method for producing metal carbide which allows for control of end-product composition.

It would also be desirable to provide a method of producing a heat source comprising metal carbide that requires fewer steps than known methods.

It would be further desirable to provide a method of producing metal carbide in which the starting materials are pre-formed into a desired shape and converted in situ to metal carbide.

It would be desirable to provide a heat source that liberates virtually no carbon monoxide upon combustion.

It would also be desirable to provide a heat source that has a low ignition temperature to allow for easy lighting under conditions typical for a conventional cigarette, while at the same time having a combustion temperature high enough to provide sufficient heat to release flavors from a flavor bed.

It would further be desirable to provide a heat source that does not self-extinguish prematurely.

It would also be desirable to provide a heat source which is stable at ambient temperature and humidity.

SUMMARY OF THE INVENTION

It is an object of this invention to provide a method for producing metal carbide which allows for control of end-product composition.

It is a further object of this invention to provide a method of producing a heat source comprising metal carbide that requires fewer steps than known methods.

It is also an object of this invention to provide a method of producing metal carbide in which the starting materials are pre-formed into a desired shape and converted in situ to metal carbide.

It is an object of this invention to provide a heat source that liberates virtually no carbon monoxide upon combustion.

It is also an object of this invention to provide a heat source that has an ignition temperature lower than that of conventional carbonaceous heat sources to allow for easy lighting under conditions typical for a conventional cigarette, while at the same time having a combustion temperature high enough to release flavors from a flavor bed.

It is yet another object of this invention to provide a heat source that does not self-extinguish prematurely.

It is a further object of this invention to provide a heat source that is stable at ambient temperature and humidity.

In accordance with this invention, there is provided a heat source, which is particularly useful in a smoking article. The heat source is formed from materials having a substantial metal carbide content. Any metal carbide capable of combusting without generating carbon monoxide is appropriate for the method of this invention. Preferred metal carbides are non-stoichiometric metal carbides, and can include aluminum carbide, titanium carbide, tungsten carbide, manganese carbide, niobium carbide, or mixtures thereof. A more preferred metal carbide is iron carbide having the formula $Fe_xC$, where x is between 1 and 3 inclusive. Most preferred metal carbides include $Fe_5C_2$ or a mixture of $Fe_5C_2$ and $Fe_3C$. As used herein, a non-stoichiometric metal carbide is any metal carbide where the crystal lattice of the metal is only partially filled by carbon atoms.

Preferably, the heat source comprises metal carbide, with smaller amounts of carbon and metal oxide.

According to the method of the present invention, a metal species and a carbon source are combined. The metal species and the carbon source are then exposed to a carbon monoxide/hydrogen gas atmosphere which, in one step, reduces and carbidizes the metal species. Preferably, the metal species/carbon source mixture is pre-formed into a desired shape before reduction/carbidization. The product of the carbidization reaction is a heat source comprising metal carbide and smaller amounts of carbon and metal oxide, which has substantially retained the original shape of the metal species.

Upon combustion, the metal carbide heat sources of this invention liberate substantially no carbon monoxide. The metal carbide has an ignition temperature substantially lower than that of conventional carbonaceous heat sources and is, therefore, easier to light. Once ignited, the carbon component of the heat source yields additional heat upon combustion, thereby preventing premature self-extinguishment.

Combustion of the metal carbide produces metal oxides and carbon dioxide without formation of any significant amount of carbon monoxide. The metal oxides produced during the combustion process may act as oxidation catalysts to promote the conversion of carbon monoxide (CO) to carbon dioxide ($CO_2$).

While the heat sources of this invention are particularly useful in smoking devices, it is to be understood that they are also useful as heat sources for other applications, where having the characteristics described herein are desired.

BRIEF DESCRIPTION OF THE DRAWINGS

The above and other objects and advantages of this invention will be apparent upon consideration of the following detailed description, taken in conjunction with the accompanying drawings, in which like reference characters refer to like parts throughout, and in which.

DETAILED DESCRIPTION OF THE INVENTION

Figure 1:
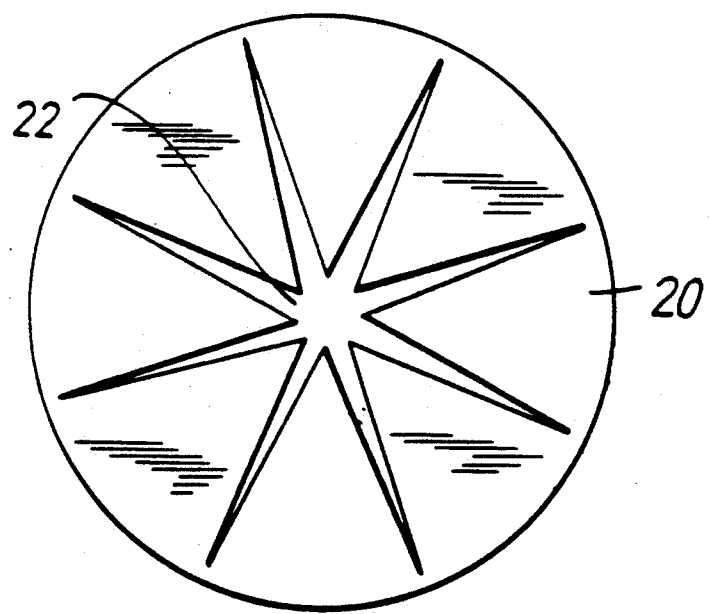
FIG. 1 depicts an end view of one embodiment of the heat source of this invention.
Figure 2:
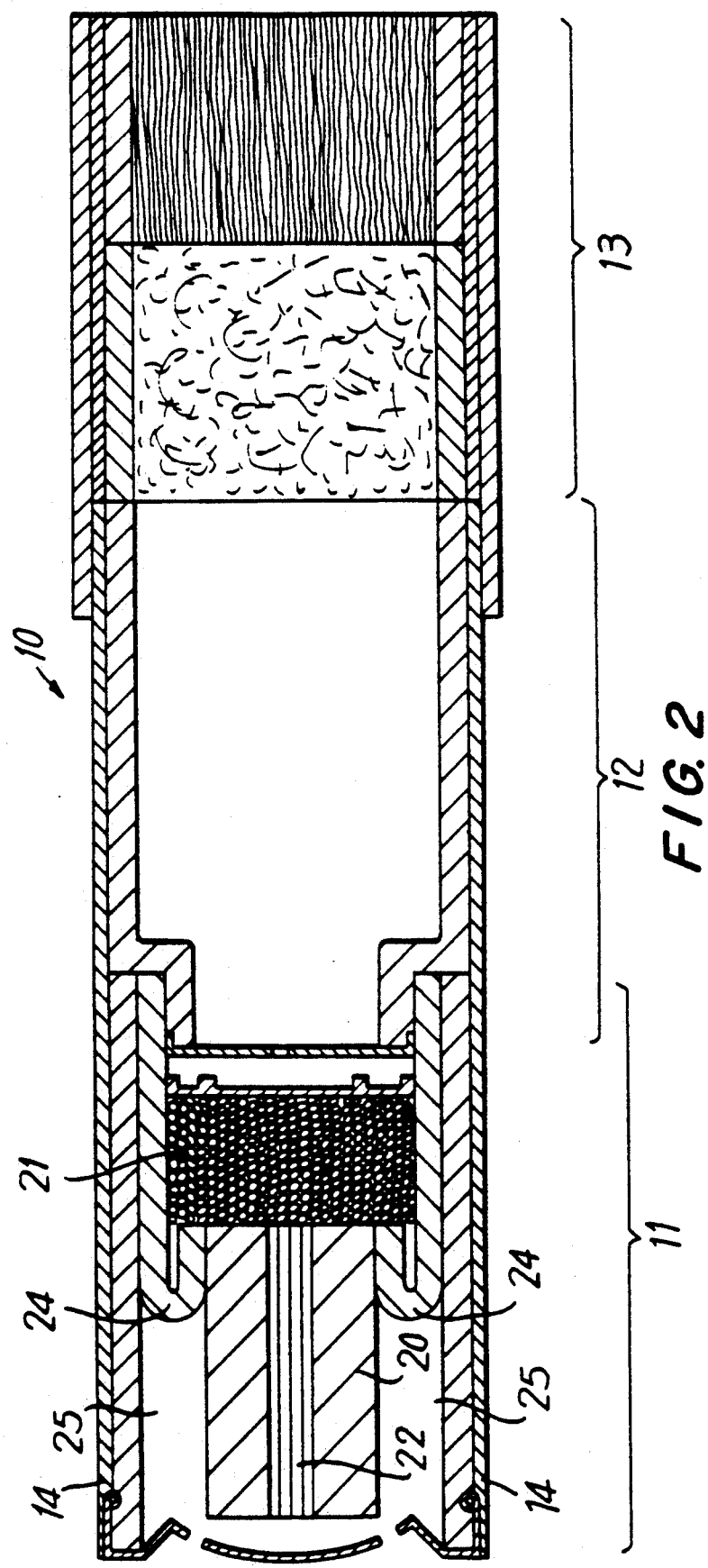
FIG. 2 depicts a longitudinal cross-sectional view of a smoking article in which the heat source of this invention may be used.

Smoking article 10 consists of an active element 11, an expansion chamber tube 12, and a mouthpiece element 13, overwrapped by a cigarette wrapping paper 14. Active element 11 includes a metal carbide heat source 20 and a flavor bed 21 which releases flavored vapors when contacted by hot gases flowing through heat source 20. The vapors pass into expansion chamber tube 12, forming an aerosol that passes to mouthpiece element 13, and then into the mouth of a smoker.

Heat source 20 should meet a number of requirements in order for smoking article 10 to perform satisfactorily. It should be small enough to fit inside smoking article 10 and still burn hot enough to ensure that the gases flowing therethrough are heated sufficiently to release enough flavor from flavor bed 21 to provide flavor to the smoker. Heat source 20 should also be capable of burning with a limited amount of air until the metal combusting in the heat source is expended. Upon combustion, heat source 20 should produce substantially no carbon monoxide. Combustion, the interaction of the heat source with oxygen to produce heat, is flameless and glowing.

Heat source 20 should have a surface area preferably in the range from about 0.25 $m^2/g$ to about 250 $m^2/g$, more preferably about 10 $m^2/g$ to about 150 $m^2/g$. Additionally, the heat sources made by this invention contain macropores (pores of between about 1 micron and about 5 microns in size), mesopores (pores of between about 20Å and about 500Å in size) and micropores (pores of up to about 20Å in size). The average pore radius for heat source 20 should be between about 10Å and about 300Å.

Heat source 20 should have an appropriate thermal conductivity. If too much heat is conducted away from the burning zone to other parts of the heat source, combustion at that point will cease when the temperature drops below the extinguishment temperature of the heat source, resulting in a smoking article which is difficult to light and which, after lighting, is subject to premature self-extinguishment. Such extinguishment is also prevented by having a heat source that undergoes essentially 100% combustion. The thermal conductivity should be at a level that allows heat source 20, upon combustion, to transfer heat to the air flowing through it without conducting heat to mounting structure 24. Oxygen coming into contact with the burning heat source will almost completely oxidize the heat source, limiting oxygen release back into expansion chamber tube 12. Mounting structure 24 should retard oxygen from reaching the rear portion of the heat source 20, thereby helping to extinguish the heat source after the flavor bed has been consumed. This also prevents the heat source from falling out of the end of the smoking article.

According to the methods of the present invention, a metal species is converted to metal carbide by:
1) mixing a metal species and a carbon source;
2) supplying heat to the mixture; and
3) contacting the mixture with a reducing/carbidizing gas atmosphere to form a metal carbide.

The metal species may be any metal-containing molecule capable of being converted to metal carbide. Preferably, the metal species is titanium oxide, tungsten oxide, manganese oxide, niobium oxide, or mixtures thereof. More preferably, the metal species is an iron oxide, metallic iron, or a mixture thereof. More preferably, the metal species is iron oxyhydroxide, $Fe_3O_4$, FeO or mixtures thereof, or, most preferably, $Fe_2O_3$ (ferric oxide). Different phases of the various metal species may be used without substantially affecting the method of the invention or the course of the carbidization reaction. Either naturally-occurring or synthetic metal oxides may be used.

The carbon source should be added in the form of substantially pure carbon, although materials which may be subsequently converted to carbon may be also used. Carbon may be either of highly crystalline graphite or of a quasi-crystalline form, including those that are turbostratic or amorphous in nature. Preferably, the carbon source is colloidal graphite, and, more preferably, activated carbon or activated charcoal.

In combining the metal species with a carbon source, a sufficient amount of carbon should be added to the metal species so that a slight amount of carbon remains in the composition following the carbidization step. Preferably, between about 2% and about 26% and, more preferably, between about 5% and about 18% by weight of carbon should be added to form the metal species/carbon source mixture.

The metal species/carbon source mixture should be in particulate form. Preferably, the particle size of the metal species and carbon source should range up to about 300 microns. More preferably, the particle size of the metal species should range in size between about submicron and about 20 microns, while the particle size of the carbon source should range in size between about submicron and about 40 microns. The particles may be prepared at the desired size, or they may be prepared at a larger size and ground down to the desired size.

The surface areas of the metal species and the carbon source particles are critical. The greater the surface area, the greater the reactivity of the metal species and the carbon source, resulting in a more efficient reduction/carbidization reaction. Preferably, the surface area of the metal species particles ranges from between about 0.2 $m^2/g$ to about 300 $m^2/g$. More preferably, the metal species particles have a surface area of between about 1 $m^2/g$ and about 150 $m^2/g$. preferably, the activated carbon particles range in surface area between about 0.5 $m^2/g$ and about 2000 $m^2/g$. More preferably, the activated carbon particle surface area ranges between about 100 $m^2/g$ and about 600 $m^2/g$.

The metal species and the carbon source may be combined in a solvent. Any solvent which increases the fluidity of the metal species/carbon source mixture and does not affect the chemical reactivities of the individual components may be used. Preferred solvents are polar solvents including, for example, methanol, ethanol, and acetone and, most preferably, water.

The metal species/carbon source mixture may then be combined with a carbonaceous binder, which confers greater mechanical stability to the metal species/- carbon source mixture. During the conversion of the mixture to metal carbide, the binder decomposes to produce predominantly carbon, carbon dioxide and carbon monoxide. The metal species/carbon source mixture is combined with the binder using any convenient method known in the art.

Any number of binders can be used to bind the particles of the metal species/carbon source mixture. The binder material may be used in combination with other additives such as potassium citrate, sodium chloride, vermiculite, bentonite or calcium carbonate. Preferred binders are those that decompose to gases below about 600° C., and include carbonaceous binders such as guar gum, cellulose derivatives such as methylcellulose, carboxymethylcellulose and hydroxypropyl cellulose, flour and konjac flour derivatives such as "Nutricol" available from Factory Mutual Corporation, starches, sugar, alginates, polyvinyl alcohols, vegetable oil, or mixtures thereof. More preferred binders are inorganic binders. A most preferred binder is Dow Chemical XUS 40303.00 Experimental Ceramic Binder. The metal species/carbon source mixture is preferably combined with the binder along with a solvent so that the mixture has a consistency suitable for extrusion.

The metal species/carbon source mixture may then be pre-formed into a desired shape. Any method capable of pre-forming the mixture into a desired shape may be used. Preferred methods of manufacture include slip casting, injection molding, and die compaction, and, most preferably, extrusion.

The method by which the heat source is manufactured will determine the amount of binder to be added to the metal species/carbon source mixture. For example, methods of manufacture that rely predominantly on pressure to form the mixture into a shape require relatively low amounts of binder. These methods include slip casting, injection molding and die compaction. Methods of manufacture that do not rely upon pressure to form the mixture into a shape, such as extrusion, require relatively greater amounts of binder. Preferably, between about 2% and about 20% binder is added to the metal species/carbon source mixture, based upon the weight of the combustible material. More preferably, between about 3% and about 10% binder is added to the metal species/carbon source mixture.

The metal species/carbon source may be formed into any desired shape. Those skilled in the art will understand that a particular application may require a particular shape. In a preferred embodiment, the mixture is formed into an elongated rod. Preferably, the rod is about 30 cm. in length. The diameter for heat source may range from about 3.0 mm to about 8.0 mm. Preferably the heat source has a diameter of between about 4.0 mm to about 5.0 mm. A final diameter of about 4.0 mm allows an annular air space around the heat source without causing the diameter of the smoking article to be larger than that of a conventional cigarette.

The rods before baking are called green rods. Because variations in the dimensions of the rods may occur during baking (see discussion, infra), it is preferable to form the green rods at a slightly larger diameter than the final diameter of the heat source.

In order to maximize the transfer of heat from the heat source to flavor bed 21, one or more air flow passageways 22 may be formed through or along the circumference of heat source 20, as described in commonly assigned U.S. Pat. No. 5,076,296. The air flow passageways should have a large geometric surface area to improve the heat transfer to the air flowing through the heat source. Alternatively, the heat source may be formed with a porosity sufficient to allow heat flow through the heat source. When the source is ignited and air is drawn through the smoking article, the air is heated as it passes around or through the heat source, or through, over, or around the air flow passageways. The heated air flows through a flavor bed, releasing a flavored aerosol for inhalation by the smoker.

The shape and number of the passageways should be chosen to maximize the internal geometric surface area of heat source 20. Preferably, when longitudinal air flow passageways such as those depicted in FIG. 1 are used, maximization of heat transfer to the flavor bed is accomplished by forming each longitudinal air flow passageway 22 in the shape of a multi-pointed star. Even more preferably, as set forth in FIG. 1, each multi-pointed star should have long narrow points and a small inside circumference defined by the innermost edges of the star. The longitudinal air flow passageways provide a larger area of heat source 20 available for combustion, resulting in a greater volume of composition involved in combustion, and therefore a hotter burning heat source.

The green rods are then placed on graphite sheets which are stacked one over the other in a stainless steel frame. The container containing the stacked graphite sheets is then placed in a heating or baking device such as a muffle furnace. Once inside the heating device, the rods are exposed to an environment which will allow the conversion of the metal species to metal carbide. Preferably, the heating device is pressurized slightly above one atmosphere to prevent diffusion of gases from the external atmosphere to within the heating device.

Figure 3:
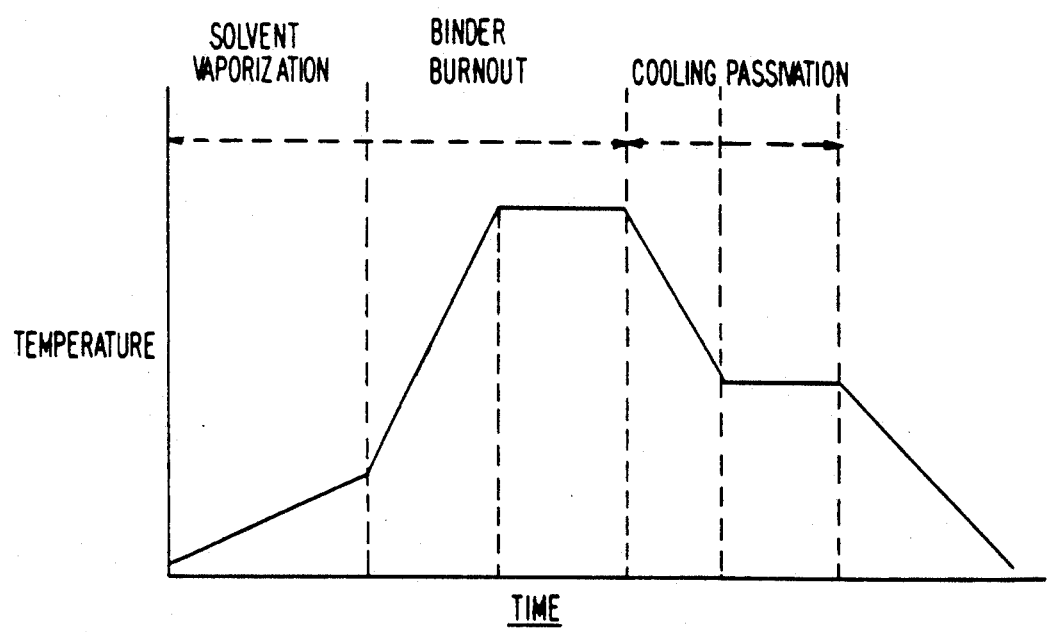
FIG. 3 depicts a heat vs. reaction profile description of the chemical conversion of the iron species to iron carbide.

The chemical conversion of the metal species to metal carbide may be accomplished by supplying heat to the green rods. Heat may be supplied in a variety of ways as follows: 1) so that a constant temperature is maintained; 2) in a series of intervals; 3) at an increasing rate; or 4) combinations thereof. Additionally, steps such as allowing the rods to cool may be employed. Preferably, however, heat is supplied, as described in FIG. 3, in a multiple stage baking process involving binder burnout followed by carbidization. Those skilled in the art will understand that thermal processes (such as solvent vaporization and binder burnout) may occur at a wide variety of temperatures and pressures.

Binder burnout involves the vaporization of any solvent present in the rod as well as the vaporization and carbonization of the carbonaceous binder. Binder burnout is accomplished by gradually supplying heat to the rod. Although increasing the temperature at a constant rate will accomplish binder burnout, it is preferable to supply heat to the rod initially in a first low rate of increase, followed by a second, greater rate of increase.

The first, low rate of temperature increase vaporizes any solvent present in the rod while preventing ruptures and cracks from forming in the rod as the solvent vaporizes. Additionally, warping and bending of the rod is substantially avoided. The initial rate of increase should be between about 0.1° C./min to about 10° C./min and preferably in the range of about 0.2° C./min to about 5° C./min. This rate of increase is maintained until a temperature in the range of about 100° C. to about 200° C., or, more preferably, a temperature of about 125° C., is reached and all solvents are vaporized.

Once the solvent in the rod has been vaporized the rate of heating is increased to decompose the binder in the rod. If a carbonaceous binder is used, it will begin to decompose to gaseous products, such as carbon monoxide and carbon dioxide, at temperatures in the range of about 200° C. to about 300° C. Consequently, the rate of heating should be such that the evolution of gaseous products from the rod is sufficiently slow to minimize microexplosions of gaseous products that might adversely affect the structural integrity of the rod. Preferably, the rate of increasing temperature is in the range of about 1° C./min to about 20° C./min. More preferably, the rate of temperature increase is in the range of about 5° C./min to about 10° C./min. The temperature is increased at this rate until the maximum temperature is reached and the carbonaceous binders are decomposed. Preferably, the maximum temperature is between about 250° C. to about 650° C.

The maximum temperature and the length of time the rods remain at the maximum temperature determines the strength of the rod and its chemical composition. The strength of the rod should be sufficient to withstand high speed manufacturing processes, although rod strength may be adjusted to match a particular application.

Reduction of the metal species occurs during the heating process by contact with a reducing gas. During heating, the carbonaceous binder decomposes to yield, inter alia, carbon monoxide, a reducing gas. Furthermore, when activated carbon is used as the carbon source, it reacts with the metal species to generate carbon monoxide and a partially reduced metal species.* With each reduction of the metal species, the CO is oxidized to $CO_2$.

* For example, when the metal species is iron oxide, CO sequentially reduces $Fe_2O_3$ to $Fe_3O_4$ and $Fe_3O_4$ to $Fe^0$.

Rather than rely totally on carbon and the evolved CO from the carbon and binders to reduce the metal species, additional reducing agents may be added to the atmosphere of the heating device. Preferably, the additional reducing agent is hydrogen gas, carbon monoxide, $CH_4$, $C_2H_4$, or mixtures thereof. More preferably, the atmosphere comprises a $CO/H_2$ gas mixture in a ratio of between about 1 part CO and 10 parts $H_2$ and about 10 parts CO and 1 part $H_2$. Most preferably, the atmosphere comprises about one part CO and about seven parts hydrogen gas.

The extent of reduction of the metal species during the binder burnout stage is also controlled by the baking temperature and the duration of baking. For example, the reduction of metal species may be complete once the maximum temperature is reached. If not, the maximum temperature should be maintained until the metal species is sufficiently reduced. At the termination of the binder burnout stage, the preferred metal product is substantially a mixture of a metal oxide of low valency* and the fully reduced metal.

* A low valency metal oxide is a metal oxide in which the metal is not in the fully oxidized state. Examples of low valency iron oxides include $Fe_3O_4$ and FeO.

The reduced metal product next undergoes carbidization to produce metal carbide. Carbidization occurs by heating the metal product at between about 250° C. and about 600° C. or, preferably, between about 300° C. and about 450° C. until the metal carbide is produced. Generally, higher carbidization temperatures require less time to produce the metal carbide. For example, when the metal carbide is iron carbide, a carbidization temperature of about 300° C. will produce iron carbide in about 4 hours, whereas a carbidization temperature of about 350° C. will require only about 3 hours to convert the iron produce to iron carbide. Too low a temperature, i.e., below about 250° C., will require that the carbidization stage proceed for an undesirably long period of time.

A carbidzation temperature of about 450° C., for any length of time, will result in a mixture of metal carbides, for example, with iron carbide, a mixture of $Fe_5C_2$ and $Fe_3C$ will be produced. The amount of carbon formed will also increase with increasing temperature and duration of baking.

Preferably, carbidization is performed at the preferred temperature range of about 300° C. to about 450° C. in the presence of a reducing/carbidizing gas, such as the reducing agents described above, to produce a heat source having a low ignition temperature, a high combustion temperature, and minimal deposits of carbon.

The metal carbide produced by the above method may contain localized pyrophoric sites having increased reactivity, which must be passivated. Passivation involves the controlled exposure of the heat source to an oxidant. Preferred oxidants include dilute oxygen, or, more preferably, dilute air. While not wishing to be bound by theory, it is believed that a low concentration of oxidant will eliminate pyrophoric sites, while preventing the uncontrolled combustion of the heat source.

As stated above, variations in the dimensions of the rod will occur during baking. Generally, between about 10% to about 20% change in volume will occur as a result of the binder burnout. This change in volume may cause warping or bending. The rod may also suffer inconsistencies in diameter. Following baking, therefore, the rod may be tooled or ground to the dimensions described above. The elongated rod is then cut into segments of between about 8 mm to about 20 mm, preferably between about 10 mm to about 14 mm.

The rod produced by this method comprises (1) between about 50% and about 85% metal carbide; (2) between about 10% and 30% carbon; and (3) between about 5% and 20% low valency metal oxide. The rod may additionally contain trace amounts of a high valency metal oxide. The metal carbide component has an ignition temperature that is sufficiently low to allow for ignition under the conditions for lighting a conventional cigarette. The carbon component, upon combustion, provides additional heat so that the heat source does not prematurely self-extinguish. The low valency metal oxide component provides heat upon combustion and acts as a catalyst, promoting the oxidation of CO to $CO_2$.

The ignition temperature of the heat source is preferably in the range of between about 175° C. and about 450° C., and, more preferably between about 190° C. and about 400° C. Upon ignition, the heat source reaches a maximum temperature of preferably between about 600° C. and about 950° C. and, more preferably, between about 650° C. and about 850° C. The maximum temperature will depend in part upon the smoking conditions and any materials in contact with the heat source which affect the availability of oxygen. Thus, the metal carbides made by the method of this invention are substantially easier to light than conventional carbonaceous heat sources and less likely to self-extinguish, but at the same time can be made to smolder at lower temperatures, thereby minimizing the risk of fire.

The heat sources made by the method of this invention are stable under a broad range of relative humidity conditions and aging times. For example, aging of the heat source up to three months under a variety of relative humidity conditions ranging from about 0% relative humidity to about 100% relative humidity should have virtually no effect on the combustion products. Furthermore, the heat sources undergo virtually no change in dimensions upon aging.

EXAMPLE 1

We combined 916 grams $Fe_2O_3$ (Fisher Products), 54 grams graphitic carbon, 30 grams pectin and water. The mixture was extruded with a single circular hole die to form green rods having a diameter of 4.6 mm. We air dried the green rods and then cut them into 10 mm length cylinders. The cylinders were then placed on a quartz plate and loaded into a quartz tube reactor (80 mm diameter, 50 cm length). The reactor was then placed in a furnace connected to a gas manifold. The furnace was heated to 300° C. over a 2 hour period at a rate of increase of 2.3° C./min as a $CO/H_2$ gas mixture at 1000 scc/m flow rate passed through it. The $CO/H_2$ ratio was maintained at 1 part CO to 7 parts $H_2$ for three hours at 300° C. The level of CO in the flowing gas was then increased to 1 part CO to 2 parts $H_2$. The $CO/H_2$ atmosphere was replaced with $N_2$ and the reactor was then cooled down to room temperature. At room temperature, air was slowly added to the flowing $N_2$ to passivate the cylindrical heat source.

The composition of the heat source was 54% iron carbide substantially in the form of $Fe_5C_2$, 10% carbon and 36% iron oxide substantially in the form of $Fe_3O_4$. Upon combustion, the cylindrical heat source made by this method evolved 2.2 microgram CO/mg heat source.

EXAMPLE 2

We repeated the procedure described in Example 1, except that the reducing/carbidizing atmosphere contained a ratio of 1 part CO to 2 parts $H_2$. This ratio was held constant throughout the preparation. We heated the green rods to 300° C. over six hours at a rate of 0.8° C./min. The flow rate of the $CO/H_2$ atmosphere was 1350 scc/m.

The composition of the heat source was 60% iron carbide substantially in the form of $Fe_5C_2$, 10% carbon and 30% iron oxide substantially in the form of $Fe_3O_4$. Upon combustion, the cylindrical heat source made by this method evolved 1.6 microgram CO/mg heat source.

EXAMPLE 3

We combined 54 grams of graphitic carbon, 60 grams of pectin, 886 grams of iron oxyhydroxide (FeOOH) and water. This mixture was extruded with a seven hole passageway die to form green rods having 4.6 mm diameter. We air dried the green rods and cut them into 10 mm length cylinders. The cylinders were loaded into the reactor in a manner identical to that described in Example 1. The reactor was heated to 400° C. at a rate of 5° C./min under a continuous flow of $N_2$. This temperature was maintained for two hours. We then lowered the temperature to 340° C. and replaced the $N_2$ with a $CO/H_2$ gas mixture in a ratio of 1 part CO, 7 parts $H_2$, at a flow rate of 1200 scc/m. The temperature was maintained for eight hours at 340° C. The mixture was then cooled to room temperature in $N_2$ Air was then slowly added to the flowing $N_2$ to passivate the cylindrical heat source.

The composition of the heat source was 86% iron carbide substantially in the form $Fe_5C_2$, 5% carbon, and 9% iron oxide substantially in the form $Fe_3O_4$. The heat of combustion was about 2300 cal/g. Upon combustion, the cylindrical heat source made by this method evolved 14.6 microgram CO/mg heat source.

EXAMPLE 4

We combined 710 grams $Fe_2O_3$, 250 grams activated carbon, 175 grams water, and 37.59 potassium citrate with a binder made from 200 grams flour, 103 grams sugar and 22 grams corn oil. The mixture was then extruded to form green rods 30 cm in length and a diameter of 5.05 mm with a single star airflow passageway. We placed the green rods into a reactor identical to that used in Example 1. We carried out the carbidization process as follows: The reactor was heated in three hours to 250° C. at a rate of increase of 1.25° C./min in air at a flow rate of 1000 scc/m. The reactor was then heated to 450° C. over 2.5 hours at a rate of increase of 2.83° C./min in air at a flow rate of 1000 scc/m. We lowered the reactor temperature to 380° C. under a stream of $N_2$ gas at a flow rate of 1000 scc/m. The reactor was then held at 380° C. for three hours with $H_2$ at a flow rate of 500 scc/m. We lowered the reactor temperature to 280° C. and held it constant for 24 hours under a stream of CO at a flow rate of 300 scc/m. The reactor was then cooled down in $N_2$ and the cylindrical heat source passivated with air.

The composition of the heat source was 49% iron carbide substantially in the form $Fe_5C_2$, 30% carbon and 21% iron oxide substantially in the form $Fe_3O_4$. The ignition temperature of the heat source was about 200° C.

Upon combustion, the cylindrical heat source evolved 74.0 microgram CO/mg heat source. During combustion, the temperature at the heat source center reached 710° C. and remained above 500° C. for about 4.0 minutes.

Thus, it is seen that this invention provides a heat source comprising metal carbides, with smaller amounts of carbon and metal oxides that forms virtually no carbon monoxide gas upon combustion and has a significantly lower ignition temperature than conventional carbonaceous heat sources, while at the same time maximizes heat transfer to the flavor bed. One skilled in the art will appreciate that the present invention can be practiced by other than the described embodiments, which are presented herein for the purpose of illustration and not of limitation, and that the present invention is limited only by the claims which follow.

We claim:

1. A method of producing metal carbide, comprising the steps of:
   a. mixing a metal species and a carbon source;
   b. supplying heat to the mixture in a plurality of intervals; and
   c. contacting the mixture with a reducing/carbidizing atmosphere.

2. A method of producing a heat source comprising a metal carbide, comprising the steps of:
   a. mixing a metal species and a carbon source;
   b. combining the mixture from step a) with a binder;
   c. forming the mixture from step b) into a shape;
   d. supplying heat to the mixture; and
   e. contacting the mixture with a reducing/carbidizing atmosphere.

3. The method of claims 1 or 2, wherein the metal species is an iron species.

4. The method of claim 3, wherein the iron species is selected from the group consisting of iron oxyhydroxide, $Fe_2O_3$, $Fe_3O_4$, FeO and mixtures thereof.

5. The method of claim 1 or 2, wherein the carbon source is selected from the group consisting of colloidal graphite, activated carbon and activated charcoal.

6. The method of claim 1 or 2, wherein the reducing/carbidizing atmosphere comprises carbon monoxide and hydrogen.

7. The method of claim 6, wherein the reducing/carbidizing atmosphere comprises about 1 part carbon monoxide and about 7 parts hydrogen.

8. The method of claim 2, wherein the binder comprises carbonaceous materials.

9. The method of claim 2, wherein the binder comprises inorganic materials.

10. The method of claim 1 or 2, wherein the heat is supplied to the mixture at a constant rate of increase.

11. The method of claim 1 or 2, wherein the heat is supplied to the mixture in a plurality of intervals.

12. The method of claim 1 or 11, wherein the heat is supplied to the mixture within at least one of the plurality of intervals at a constant rate of increase.

13. The method of claim 12, wherein the rate of increase is up to about 20° C./min.

14. The method of claim 12, wherein the heat is supplied to the mixture until a temperature of between about 250° C. to about 650° C. is reached.

15. The method of claim 1 or 11, wherein the heat is supplied to the mixture in two intervals.

16. The method of claim 15, wherein the heat is supplied to the mixture in the first interval at a first rate of increase and in the second interval at a second rate of increase.

17. The method of claim 16, wherein the first rate of increase is between about 0.1° C./min. and about 10° C./min.

18. The method of claim 16, wherein heat is supplied to the mixture in the first interval until a temperature of between about 100° C. and about 200° C. is reached.

19. The method of claim 16, wherein the first rate of increase is between about 0.2° C./min and about 5° C./min and heat is supplied to the mixture in the first interval until a temperature of about 125° C. is reached.

20. The method of claim 16, wherein the second rate of increase is between about 1° C./min. and about 20° C./min.

21. The method of claim 16, wherein heat is supplied to the mixture in the second interval until a temperature of between about 250° C. to about 650° C. is reached.

22. The method of claim 16., wherein the second rate of increase is between about 5° C./min to about 10° C./min and heat is supplied to the mixture in the second interval until a temperature of between about 250° C. and about 650° C. is reached.

23. The method of claim 1 or 2 wherein the metal species and carbon source are combined in a polar solvent.

24. The method of claim 23, wherein the polar solvent is selected from the group consisting of water acetone, methanol and ethanol.

25. The method of claim 1 or 2, wherein the metal species is in particulate form having a particle size of up to about 300 microns.

26. The method of claim 1 or 2, wherein the metal species is in particulate form having a particle size of between about submicron and about 20 microns.

27. The method of claim 1 or 2, wherein the metal species has a surface area of between about 0.2 $m^2/g$ and about 300 $m^2/g$.

28. The method of claim 1 or 2, wherein the metal species has a surface area of between about 1 $m^2/g$ and about 150 $m^2/g$.

29. The method of claim 1 or 2, wherein the carbon source is in particulate form having a particle size of up to about 300 microns.

30. The method of claim 1 or 2, wherein the carbon source is in particulate form having a particle size of between about submicron and about 40 microns.

31. The method of claim 1 or 2, wherein the carbon source has a surface area of between about 0.5 $m^2/g$ and about 2000 $m^2/g$.

32. The method of claim 1 or 2, wherein the carbon source has a surface area of between about 100 and about 600 $m^2/g$.

33. A heat source for use in a smoking article comprising metal carbide, low valency metal oxide and carbon, wherein the heat source is substantially in the form of a rod and has one or more fluid passages therethrough.

34. The heat source of claim 33 wherein the metal carbide comprises $Fe_5C_2$ and the low valency metal oxide is FeO.

35. The heat source of claim 33 wherein the metal carbide comprises a mixture of $Fe_5C_2$ and $Fe_3C$.

36. The heat source of claim 33, wherein the heat source is substantially in the form of a cylindrical rod.

37. The heat source of claim 36, wherein the fluid passages are formed as grooves around the circumference of the cylindrical rod.

38. The heat source of claim 36, wherein the fluid passages are formed in the shape of a multi-pointed star.

39. The heat source of claim 36, wherein the cylindrical rod has a diameter of between about 3.0 mm and about 8.0 mm, and a length of between about 10 mm and about 14 mm.

40. The heat source of claim 36, wherein the cylindrical rod has a diameter of between about 4.0 mm and 5.0 mm.

41. A method of producing metal carbide, comprising the steps of:
a. mixing a metal species and a carbon source;
b. supplying heat to the mixture at a constant rate of increase; and
c. contacting the mixture with a reducing/carbidizing atmosphere.

42. A smoking article comprising a heat source, wherein the heat source comprises metal carbide, low valency metal oxide and carbon.

* * * * *

UNITED STATES PATENT AND TRADEMARK OFFICE
CERTIFICATE OF CORRECTION

PATENT NO. : 5,247,949
DATED : September 28, 1993
INVENTOR(S) : Seetharama C. Deevi et al.

It is certified that error appears in the above-indentified patent and that said Letters Patent is hereby corrected as shown below:

Claim 10, column 13, line 20, delete "1 or".

Claim 11, column 13, line 22, delete "1 or".

Signed and Sealed this

Twenty-sixth Day of July, 1994

Attest:

BRUCE LEHMAN

Attesting Officer

Commissioner of Patents and Trademarks